(12) United States Patent
Duerksen et al.

(10) Patent No.: US 9,765,178 B2
(45) Date of Patent: Sep. 19, 2017

(54) SELF-WRITING WAVEGUIDE WITH NANOPARTICLES

(71) Applicant: EMPIRE TECHNOLOGY DEVELOPMENT LLC, Wilmington, DE (US)

(72) Inventors: Gary L. Duerksen, Ward, CO (US); Seth Adrian Miller, Englewood, CO (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/899,123

(22) PCT Filed: Jun. 19, 2013

(86) PCT No.: PCT/US2013/046667
§ 371 (c)(1),
(2) Date: Dec. 17, 2015

(87) PCT Pub. No.: WO2014/204458
PCT Pub. Date: Dec. 24, 2014

(65) Prior Publication Data
US 2016/0145378 A1 May 26, 2016

(51) Int. Cl.
*C08F 2/46* (2006.01)
*C08F 2/50* (2006.01)
*C08G 61/04* (2006.01)
*C08G 59/02* (2006.01)
*B29D 11/00* (2006.01)
*G02B 6/10* (2006.01)
*G02B 6/02* (2006.01)

(52) U.S. Cl.
CPC ...... *C08G 59/022* (2013.01); *B29D 11/00663* (2013.01); *G02B 6/02033* (2013.01); *G02B 6/10* (2013.01)

(58) Field of Classification Search
CPC .................................................. C08G 59/022
USPC ............................................. 522/2, 1; 520/1
See application file for complete search history.

(56) References Cited

U.S. PATENT DOCUMENTS

| | | | |
|---|---|---|---|
| 4,846,905 A | 7/1989 | Tarbutton et al. | |
| 5,046,800 A | 9/1991 | Blyler, Jr. et al. | |
| 5,124,417 A | 6/1992 | Farooq | |
| 5,252,694 A | 10/1993 | Willett et al. | |
| 5,917,006 A | 6/1999 | Smith et al. | |
| 6,058,228 A | 5/2000 | Fasanella et al. | |
| 6,363,097 B1 | 3/2002 | Linke et al. | |
| 6,681,067 B1 | 1/2004 | Kersey | |
| 6,716,891 B1 | 4/2004 | Meisenburg et al. | |
| 6,785,439 B2 | 8/2004 | Hoke et al. | |
| 7,181,114 B2 | 2/2007 | Lee et al. | |
| 7,389,029 B2 | 6/2008 | Rahman et al. | |
| 7,390,532 B2 | 6/2008 | Dellwo et al. | |
| 7,738,752 B2 | 6/2010 | Yamagiwa et al. | |
| 8,017,193 B1 * | 9/2011 | Zhou .................... | G02B 6/1221 385/129 |
| 8,380,027 B2 | 2/2013 | Reed et al. | |
| 2003/0055120 A1 * | 3/2003 | Blomquist ............... | C08F 2/46 522/1 |
| 2004/0155517 A1 | 8/2004 | Stupp et al. | |
| 2004/0233526 A1 * | 11/2004 | Kaminsky ............. | G02B 1/045 359/452 |
| 2006/0165368 A1 | 7/2006 | Colombo et al. | |
| 2006/0216508 A1 * | 9/2006 | Denisyuk ............... | B82Y 10/00 428/402 |
| 2008/0209876 A1 | 9/2008 | Miller | |
| 2009/0238514 A1 | 9/2009 | Hu et al. | |
| 2010/0004389 A1 | 1/2010 | Paley et al. | |
| 2010/0069523 A1 | 3/2010 | Alvarez et al. | |
| 2011/0085773 A1 | 4/2011 | Kim | |
| 2011/0170210 A1 * | 7/2011 | Helvajian ................ | G02B 7/00 359/896 |
| 2011/0242631 A1 * | 10/2011 | de Oliveira ............. | G02B 1/04 359/19 |
| 2012/0155819 A1 | 6/2012 | Hirayama et al. | |
| 2012/0262664 A1 | 10/2012 | Kues et al. | |
| 2014/0378587 A1 | 12/2014 | Weiher et al. | |

OTHER PUBLICATIONS

Kagami et al, Light-induced Self-written Optical Waveguides, May 2007, IEICE Trans. Electron, vol. E90-C, No. 5, 1061-1070.*
"Epoxy Resins Product Overview," DOW EPOXY, Latin American Solid (Solution) Epoxy Products, accessed at http://web.archive.org/web/20140527055435/http://msdssearch.dow.com/PublishedLiteratureDOWCOM/dh_01f5/0901b803801f57b6.pdf?filepat%20h=epoxy/pdfs/noreg/296-01684.pdf &fromPage=GetDoc, accessed on Feb. 16, 2016, pp. 4.
Barrett, C.J, et al., "Photoinscription of channel waveguides and grating couplers in azobenzene polymer thin films," Proceedings of SPIE—The International Society for Optical Engineering (Impact Factor: 0.2), vol. 3006, pp. 441-449 (Jan. 22, 1997).
Kogelnik, H., "Coupled wave theory for thick hologram gratings," The Bell System Technical Journal, Copyright © 1969, American Telephone and Telegraph Company, vol. 48, No. 9, pp. 2909-2947 (Nov. 1969).

(Continued)

*Primary Examiner* — Jessica E Whiteley
(74) *Attorney, Agent, or Firm* — Turk IP Law, LLC

(57) ABSTRACT

Technologies are generally described for fabricating a self-writing waveguide. Two photo-reactive liquid monomers, each infused with a photo-initiator, may be mixed and dissolved in a carrier solvent to form a mixture. Nanoparticles may be added to the mixture to form a gel. A focused light beam may be provided to cure one of the monomers, initiating polymerization to form a core of the self-writing waveguide. An optional exposure to an optical source, a heat source, or an electron beam source may cure the other monomer, initiating polymerization to form a cladding of the self-writing waveguide. The self-writing waveguide may be formed in a substantially tubular structure or a planar film structure.

21 Claims, 10 Drawing Sheets

(56) References Cited

OTHER PUBLICATIONS

Lausten, R., et al., "Optically reconfigurable azobenzene polymer-based fiber Bragg filter," Applied Optics, vol. 44, No. 33, pp. 7039-7042 (Nov. 20, 2005).
Noda, A., and Watanabe, M., "Highly conductive polymer electrolytes prepared by in situ polymerization of vinyl monomers in room temperature molten salts," Electrochimica Acta, vol. 45, Issues 8-9, pp. 1265-1270 (Jan. 2000).
Parker, R.M., et al., "Using the photoinduced reversible refractive-index change of an azobenzene co-polymer to reconfigure an optical Bragg grating," Journal of Materials Chemistry, vol. 20, pp. 9118-9125 (Sep. 9, 2010).
Phillips, N.J., "Photopolymers and Holograms," De Montfort Univ., Leicester, United Kingdom (1997).
Savas T.A., et al., Large-area achromatic interferometric lithography for 100 nm period gratings and grids Journal of Vacuum Science & Technology B: Microelectronics and Nanometer Structures, © 1996 American Vacuum Society, vol. 14, No. 6, pp. 4167-4170 (Nov. 1996).
Sigma-Aldrich, "Dodecyl and tetradecyl glycidyl ethers," Technical Grade, CAS No. 68609-97-2, pp. 2 (2006).
Sigma-Aldrich, "Glycidyl 4-nonylphenyl ether," Technical Grade, CAS No. 6178-32-1, pp. 3 (2006).
Trout, T.J., et al., "Optical Photopolymers: Design and Applications," Advanced Materials, vol. 10, No. 15, pp. 1219-1224 (Oct. 1998).
"H-Nu Visible Light & Infrared Photoinitiators," accessed at http://web.archive.org/web/20120609181659/http://www.sglinc.com/photoin.htm, accessed on Apr. 23, 2012, pp. 5.
Ameduri, B., et al., "From Vinylidene Fluoride (VDF) to the Applications of VDF-Containing Polymers and Copolymers: Recent Developments and Future Trends\," Chem. Rev, vol. 109, No. 12, pp. 6632-6686 (2009).
Deng, K-L, et al., "Self-Aligned Single-Mode Polymer Waveguide Interconnections for Efficient Chip-to-Chip Optical Coupling," IEEE Journal of Selected Topics in Quantum Electronics, vol. 12, No. 5, pp. 923-929 (Oct. 2006).
International Search Report and Written Opinion for International Application No. PCT/US2013/46667 mailed on Jan. 17, 2014.
Jisha, C.P., et al., "Self-written waveguide in methylene blue sensitized poly(vinyl alcohol)/acrylamide photopolymer material," Applied Optics, vol. 47, No. 35, pp. 6502-6507 (Dec. 10, 2008).
Kagami, M., et al., "Light-Induced Self-Written Optical Waveguides," IEICE Trans. Electron., vol. E90-C, No. 5, pp. 1061-1070 (2007).
Kagami, M., et al., "Light-induced self-written three-dimensional optical waveguide," Applied Physics Letters, vol. 79, No. 8, pp. 1079-1081 (2001).
Kang, B., et al., "Microelectrode fabrication by laser direct curing of tiny nanoparticle self-generated from organometallic ink," Optics Express, vol. 19, No. 3, pp. 2573-2579 (2011).
Loiacono, R., et al., "Laser erasable implanted gratings for integrated silicon photonics," Optics Express, vol. 19, No. 11, pp. 10728-10734 (May 23, 2011).
Mizeikis, V., et al., "Direct Laser Writing: Versatile Tool for Microfabrication of Lithium Niobate," JLMN-Journal of Laser Micro/Nanoengineering, vol. 7, No. 3, pp. 345-350 (2012).
Mogens, R.P. et al., "Advances in silica-based integrated optics," Opt. Eng., vol. 42, Issue 10, pp. 2821-2834 (2003).
Obata, Y., et al., "Self-written waveguide on a VCSEL-emitting window using a photomask transfer method," IEEE Photonics Technology Letters, vol. 18, No. 12, pp. 1308-1310 (Jun. 15, 2006).
Richter, A.K., and Carlson, F.P., "Guided Waves in Alkali-Halide Films," Technical report, pp. 1-22 (Dec. 1976).
Song, J.Y., et al., "Review of gel-type polymer electrolytes for lithium-ion batteries," Journal of Power Sources, vol. 77, Issue 2, pp. 183-197 (1999).
Svalgaard, M., Direct writing of planar waveguide power splitters and directional couplers using a focused ultraviolet laser beam, Electronics Letters, vol. 33, Issue 20, pp. 1694-1695 (1997).
Tomić, D., and Mickelson, A., "Photobleaching for optical waveguide formation in a guest-host polyimide," Applied Optics, vol. 38, No. 18, pp. 3893-3903 (Jun. 20, 1999).
Walls, H. J., et al., "Nanocomposite Electrolytes with Fumed Silica and Hectorite Clay Networks: Passive versus Active Fillers," Advanced Functional Materials, vol. 13, No. 9, pp. 710-717 (Sep. 2003).
Walls, H.J., et al., "Fumed silica-based composite polymer electrolytes: synthesis, rheology, and electrochemistry," Journal of Power Sources, vol. 89, pp. 156-162 (2000).
Wang, P., et al., "Gelation of Ionic Liquid-Based Electrolytes with Silica Nanoparticles for Quasi-Solid-State Dye-Sensitized Solar Cells," Journal of the American Chemical Society, vol. 125, pp. 1166-1167 (2003).
Yamashita, T., et al., "Fabrication of Self-Written Polymeric Waveguides Using Near-Infrared Light From Single-Mode Devices," 17th Microoptics Conference (MOC'11), pp. 1-2 (Oct. 30-Nov. 2, 2011).
Zhao, P., et al., "Novel multimode coupler switch," Microwave and Optical Technology Letters, vol. 17, Issue 1, pp. 1-7 (1998).

\* cited by examiner

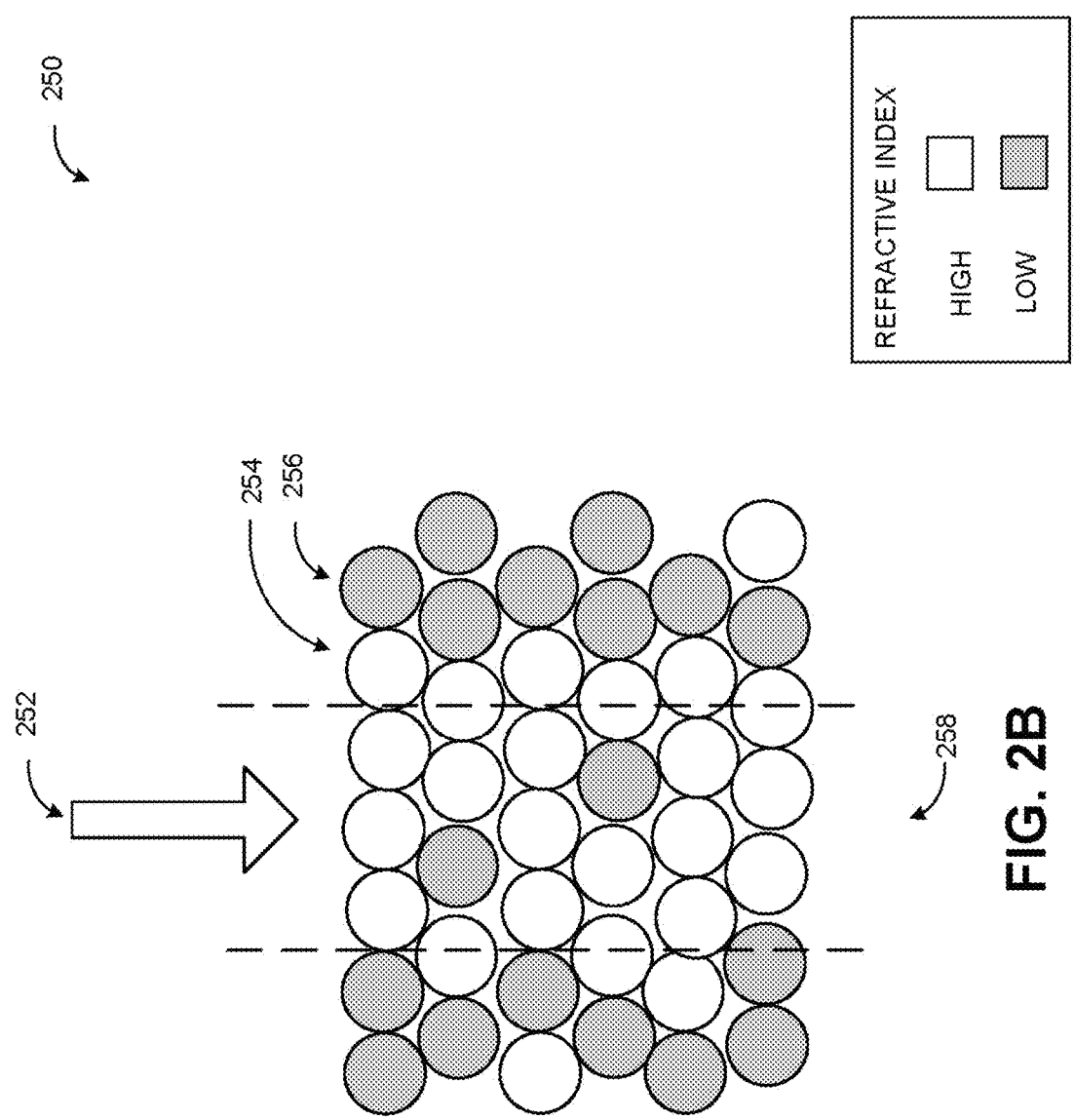

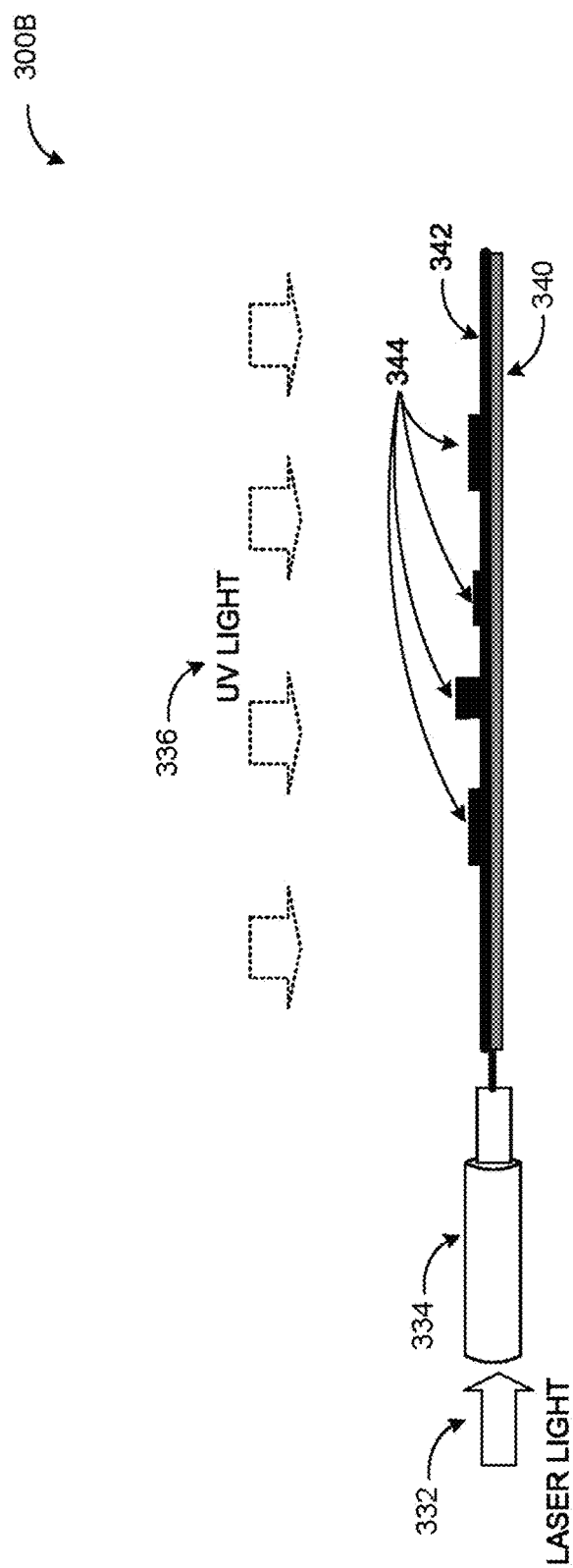

SELF-WRITING WAVEGUIDE WITH NANOPARTICLES

CROSS REFERENCE TO RELATED APPLICATION

This Application is a U.S. National Stage filing under 35 USC. §371 of PCT Application Ser. No. PCT/US13/046667 filed on Jun. 19, 2013. The disclosure of the PCT application is hereby incorporated by reference in its entirety.

BACKGROUND

Unless otherwise indicated herein, the materials described in this section are not prior art to the claims in this application and are not admitted to be prior art by inclusion in this section.

A self-written waveguide is a wave-guiding structure created when an optical beam is passed through a medium, to polymerize one or more self-writing materials. Initiation of polymerization by a curing source may concentrate the optical beam, yielding a waveguide structure with dimensions that automatically scale to the guided-wave mode of the wavelength of beam used to create the waveguide path. A self-writing approach to waveguide formation may be used as a method for creating optical interconnects and may eliminate the need for optical alignment between the interconnect and source. However, conventional self-writing approaches to waveguide formation, such as liquid resins, polymer/liquid mixtures, and photo-bleaching of pure polymers may not be optimal for time and cost-effective manufacturing.

SUMMARY

The present disclosure generally describes techniques for fabricating a self-writing waveguide.

According to some examples, a method is provided for fabricating a self-writing waveguide. The method may include mixing a first photo-reactive liquid monomer and a second photo-reactive liquid monomer to form a mixture, and adding nanoparticles to the mixture. The method may also include providing a focused light beam to cure the first monomer.

According to other examples, a self-writing waveguide composed of nanoparticle-gelled polymers is described. The self-writing waveguide may include a core portion composed of a first polymer and a cladding portion composed of a second polymer. A first photo-reactive liquid monomer and a second photo-reactive liquid monomer gelled by nanoparticles may be mixed, a focused light beam provided to cure the first monomer, and the mixture exposed to at least one of an optical source, a heat source, and an electron beam source for curing the second monomer upon polymerization of the first monomer.

According to further examples, a system is described for forming a self-writing waveguide. The system may include a material formulation module configured to prepare a mixture of a first photo-reactive liquid monomer and a second photo-reactive liquid monomer combined with nanoparticles. The system may also include a curing module configured to provide a focused light beam to cure the first monomer and a controller configured to coordinate one or more operations of the material formulation module and the curing module.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2B illustrates a waveguide formed after a focused light beam is provided to a self-writing material, where shaded circles indicate low reflective index and unshaded circles indicate high refractive index;

FIG. 3B illustrates a laser and ultra-violet (UV) curable material use in fabrication of an example self-writing waveguide;

DETAILED DESCRIPTION

Figure 1A:
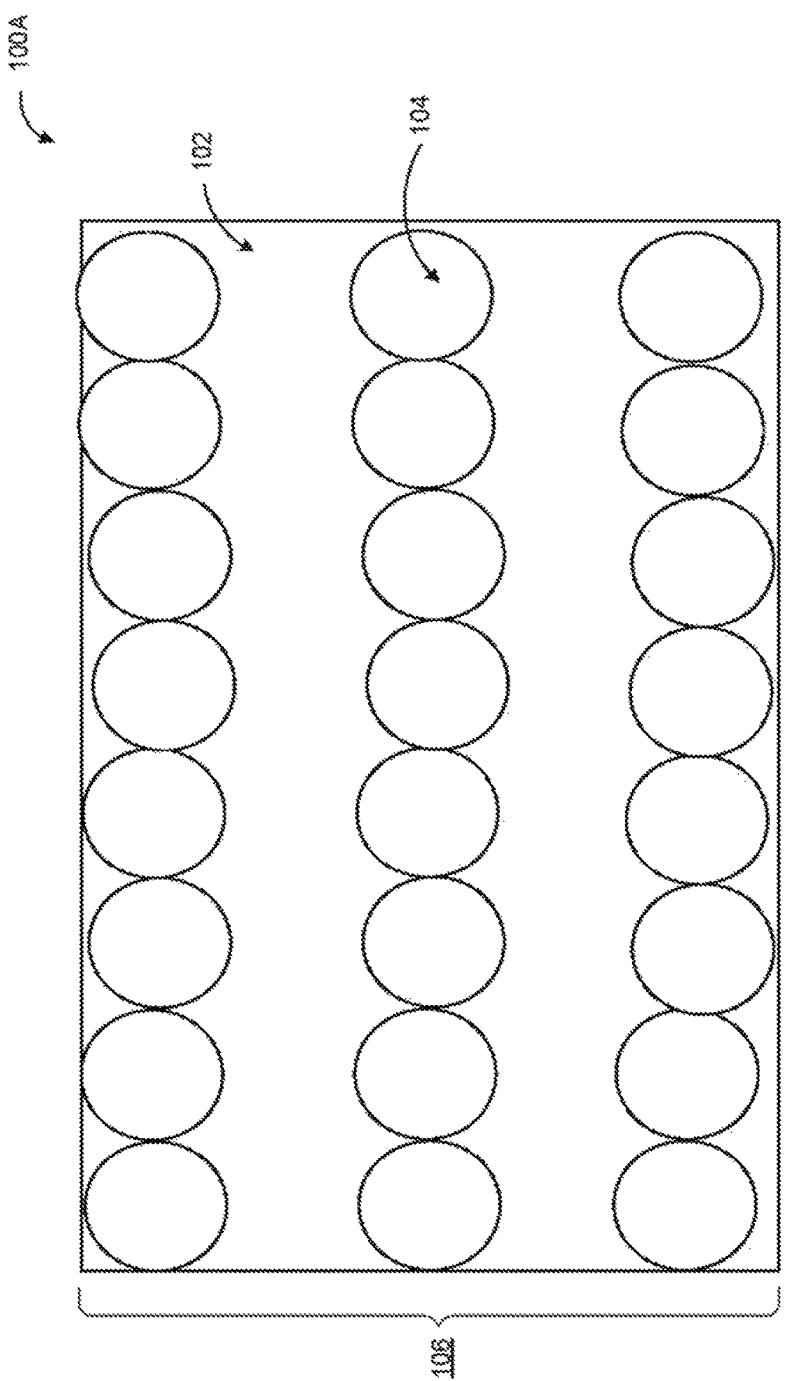
FIG. 1A illustrates an example of a self-writing material formulated from a mixture, composed of a first and a second photo-reactive liquid monomer, and one or more chains of nanoparticles.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn to methods, apparatus, systems, devices, and/or computer program products related to fabrication of a self-writing waveguide.

Briefly stated, technologies are generally described for fabricating a self-writing waveguide. Two photo-reactive liquid monomers, each infused with a photo-initiator, may be mixed and dissolved in a carrier solvent to form a mixture. Nanoparticles may be added to the mixture to form a gel. A focused light beam may be provided to cure one of the monomers, initiating polymerization to form a core of the self-writing waveguide. An optional exposure to an optical source, a heat source, or an electron beam source may cure the other monomer, initiating polymerization to form a cladding of the self-writing waveguide. The self-writing waveguide may be formed in a substantially tubular structure or a planar film structure.

Figure 1B:
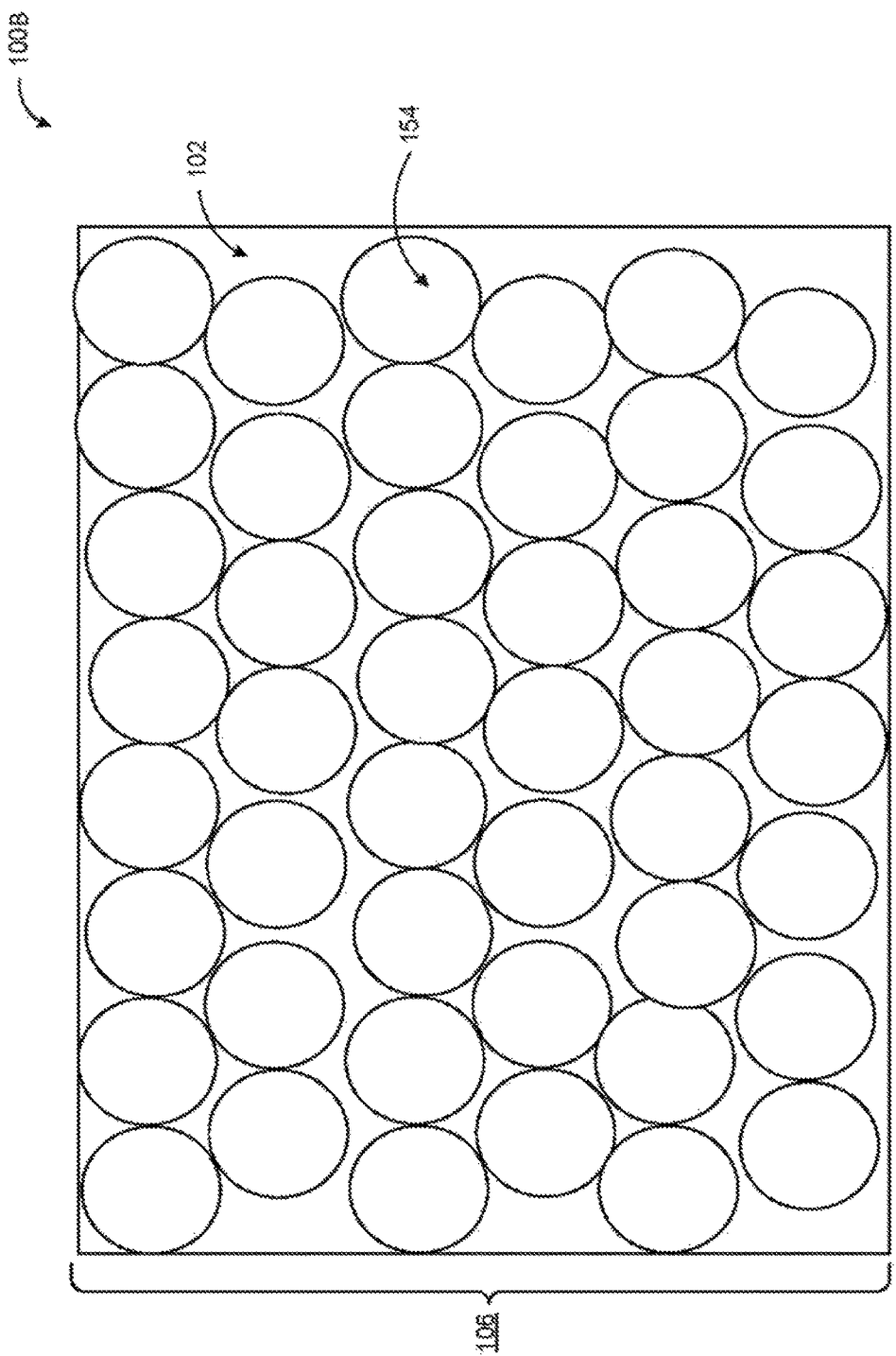
FIG. 1B illustrates another example of a self-writing material formulated from a mixture, composed of a first and a second photo-reactive liquid monomer, and closely packed nanoparticles.

FIGS. 1A and 1B illustrate examples of a self-writing material formulated from a mixture, composed of a first and a second liquid photo reactive monomer, and nanoparticles, where the fraction of nanoparticles added to the mixture may vary, arranged in accordance with at least some embodiments described herein.

As shown in a diagram 100A, a self-writing material 106 may be formulated from a mixture 102, composed of a first photo-reactive liquid monomer and a second photo-reactive liquid monomer, and one or more chains of nanoparticles 104. As shown in a diagram 100B, nanoparticles 154 within the self-writing material 106 may also be closely packed.

The first and second photo-reactive monomers may be mixed and dissolved in a carrier solvent, such as isopropyl alcohol (IPA), to form the mixture 102. Nanoparticles may then be added to the mixture 102 by shear-mixing or sonication to form the self-writing material 106, which may be in the form of a gel. The gel may allow the liquid monomers to diffuse freely. Each monomer selected and the type and number of nanoparticles selected may be based on a curing speed of the mixture, a mechanical modulus of the mixture, or a refractive index difference between the first and second monomers upon curing. The first monomer, the second monomer, and the nanoparticles may further be selected to ensure that the self-writing waveguide has an operational temperature range of about −55° C. to about 125° C.

The first photo-reactive monomer may be a polymerizable cationic monomer or a polymerizable ionic monomer, in some examples. A cationic monomer may polymerize by a cationic mechanism. An ionic monomer may contain cations and anions in which, the anions of the monomer may polymerize by a radical mechanism and the cations may polymerize by a cationic mechanism. An ionic monomer may be strategically applied as the first photo-reactive monomer to reduce the volatility of the monomer and to improve the thermal stability of a planar film structure in which the self-writing waveguide may be formed. The second photo-reactive monomer may be a polymerizable radical monomer, in other examples. The first and second photo-reactive monomers may each be infused with a photo-initiator prior to mixing. The first cationic monomer may be infused with a cationic photo-initiator, such as 4,4[prime]-Bis[di(â-hydroxy)phenylsulfonic]phenylsulfide-bis-hexafluoroantimonate. The second radical monomer may be infused with a radical photo-initiator, such as H-Nu-IR 815. These photo-initiators may be activated to initiate polymerization of the first and second photo-reactive monomers in response to a focused light beam and exposure to an optical, heat, or electron beam source, respectively.

The nanoparticles added to the mixture may be fumed silica, acidic silica, alumina, titania, or ceria. Acidic, silica, may be strategically selected to, improve the mechanical integrity of the planar film structure in which the self-writing waveguide may be formed. The fraction of nanoparticles added to the mixture may vary from one or more chains to closely-packed as illustrated in FIGS. 1A and 1B. The higher the fraction of nanoparticles in the mixture, the stiffer the tubular structure or planar film structure in which the self-writing waveguide is formed may be.

Addition of the nanoparticles' to the mixture may form a gel due to the interconnect among the particles that create internal scaffolding. The first and second photo-reactive monomers may be held to the nanoparticles by capillary forces, which prevent them from flowing as a traditional liquid, forming a two-phase medium. The nanoparticle-gelled liquid mixture may be robust under applied force due to the mechanical support created by the nanoparticle interconnects allowing self-supporting and free-standing films to be formed while still allowing liquids to freely diffuse in the spaces between, the nanoparticles. Material formulations composed of nanoparticle-gelled liquids may be mechanically and thermally robust up to and above 300° C. and may permit nanometer-scale diffusion of the one or more liquid monomers during polymerization.

Material formulations for the preparation of self-writing waveguides may include mixtures of photo-reactive liquids, a photo-reactive liquid mixed with an inert polymer, and pure polymers doped with dye molecules and destroyed by photo-bleaching. For time and cost-effective manufacturing of self-writing waveguides, three criteria of the material formulations may be considered: curing speed of the mixture, a mechanical modulus of the mixture, or a refractive index difference between the first and second monomers upon curing. The curing speed of the mixture may define a manufacturability of a process, in which a high curing speed may be preferred. The mechanical modulus of the mixture may define the ease of handling the materials as planar film structures and the refractive index between the first and second monomers may define waveguide size and functionality. The photo-reactive liquid mixtures may have a high cure speed preferred for time and cost effective manufacturing, but the mixture may have a zero value mechanical modulus due to the inability of liquids to be handled as a film. The photo-reactive liquids mixed with inert polymers may have a low cure speed due to low diffusivity and may not be able to achieve high differences in refractive index between the first and second components, characteristics that do not permit time and cost-effective manufacturing. The material formulation of the mixture composed of photo-reactive liquid monomers and nanoparticles presented above may provide a high curing speed due to high diffusivity and a high mechanical modulus due to the mechanical integrity of tubular and planar film structures allowed by the addition of nanoparticles. These characteristics may possibly allow time and cost-effective manufacturing of self-writing waveguides.

Figure 2A:
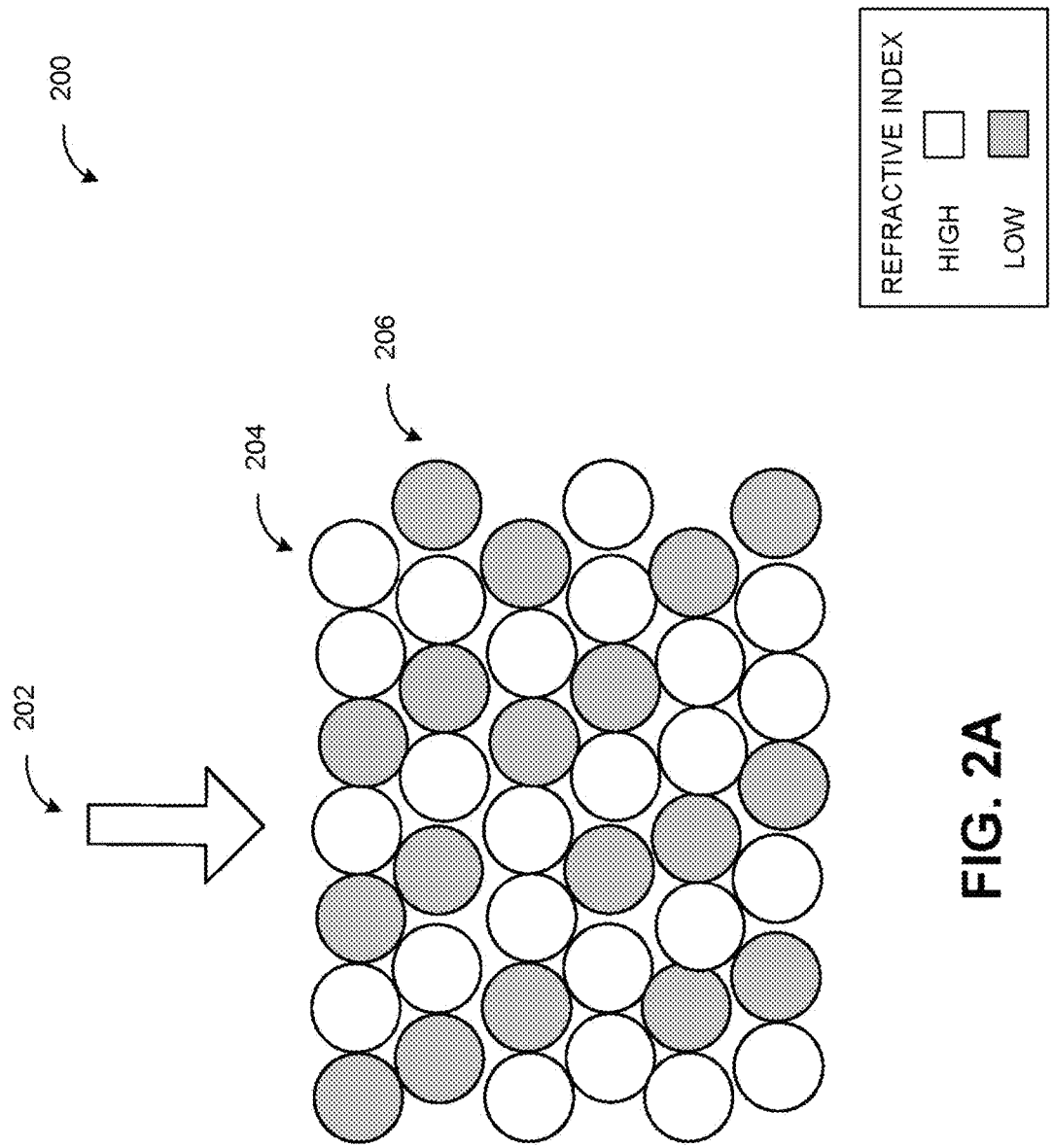
FIG. 2A illustrates a self-writing material prior to provision of a focused light beam, where shaded circles indicate low reflective index and unshaded circles indicate high refractive index.

FIG. 2A illustrates a self-writing material, prior to provision of a focused light beam, arranged in accordance with at least some embodiments described herein.

As shown in a diagram 200, a self-writing material formulation may include a mixture of a first photo-reactive liquid monomer 204 and a second photo-reactive liquid monomer 206 dissolved in a carrier solvent. The first and second monomers may be of varying refractive indices, high and low, respectively. Prior to provision of a focused light beam 202, the first and second photo-reactive liquid monomers of the mixture may be in a random configuration as illustrated.

The self-writing material may be designed so that upon provision of a focused light beam the polymerized material has a higher refractive index than the starting material. There may be limits to the refractive index difference between the polymerized and un-polymerized regions of the self-writing material, which may place a limit on how tightly an optical source may be confined in a waveguide. The less tightly the optical source is confined, the more the optical source may be, perturbed by external influences resulting in a larger waveguide structure. If the refractive index difference is too small, the resulting waveguide may not facilitate communication for applications requiring communication over lengths greater than a few microns.

Increasing the refractive index difference between the polymerized and un-polymerized regions of the self-writing material may be possible by using a mixture of photo-reactive liquid monomers in initial formulation. Using the mixture of liquid monomers may be particularly advantageous because the diffusion constant of the constituents are high, which may allow the writing process to be fast and effective. Using the mixture of liquid monomers may also allow mixing of different starting materials, such as fluorocarbons (low refractive index) and aromatics (high refractive index), that may not be intimately mixed as solids.

A possible disadvantage of using the mixture of liquid monomers is that the mixture may need to be contained in a type of packaging, adding cost and preventing the technique from being applied in a thin film format. By adding the nanoparticles to the liquid mixture of photo-reactive monomers to form a gel, the mechanical support created by the nanoparticle interconnects may overcome the above disadvantage. The nanoparticle interconnects may allow formation of self-supporting and free-standing films, while still allowing liquids to freely diffuse in the spaces between the nanoparticles.

FIG. 2B illustrates a waveguide formed after a focused light beam is provided to a self-writing material, arranged in accordance with at least some embodiments described herein.

As shown in a diagram 250, a self-writing material formulation may include a mixture of a first photo-reactive liquid monomer 254 and a second photo-reactive liquid monomer 256 dissolved in a carrier solution. The first and second monomers may be of varying refractive indices, high and low, respectively. After addition of nanoparticles to the mixture to form a gel, a focused light beam 252 may be provided to the gel to cure the first photo-reactive liquid monomer 254, initiating polymerization. Polymerization may create a high refractive index region in the focused light beam path 258 that may form a core of a self-writing waveguide.

Upon provision of the focused light beam, a photo-initiator infused into the first photo-reactive liquid monomer 254 may be activated initiating polymerization. As the first monomer diffuses into the focused light beam path and becomes polymerized, the second photo-reactive monomer 256 may diffuse freely, remaining in liquid form. Over time, the focused light beam path may become rich with the first monomer, creating a high refractive index region in the light beam path 258 that may form a core of a self-writing waveguide. The waveguide may possess dimensions automatically scaled to a guided-wave mode of the light beam wavelength used to form the focused light beam path. The focused light beam may be provided in visible, infrared, or ultra-violet light spectra or may be provided as a laser beam with, a wavelength of about 390 nm to about 980 nm. After the first monomer is substantially cured the focused light beam may be terminated.

Figure 3A:
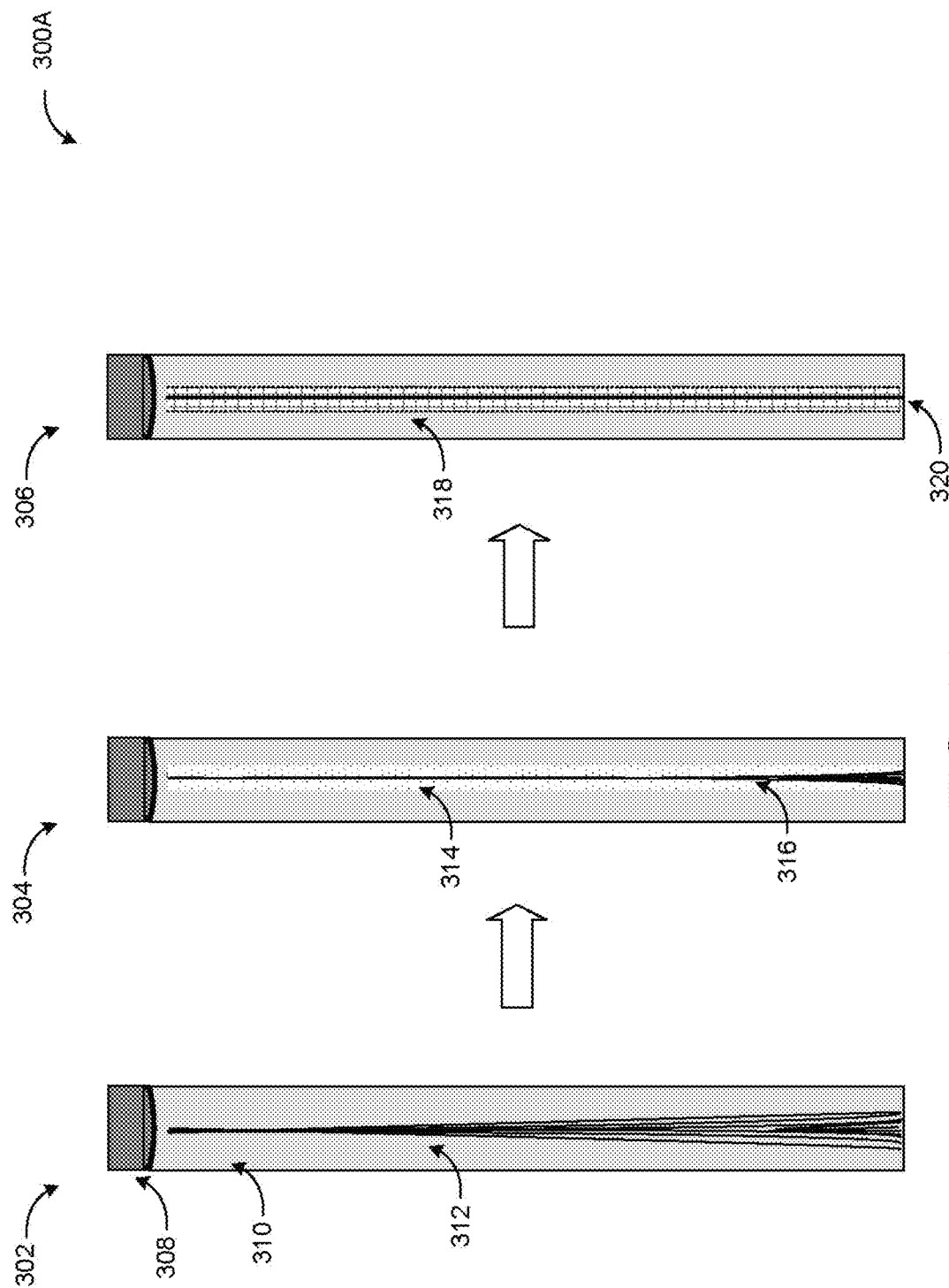
FIG. 3A illustrates an example growth process of a self-writing waveguide.

FIG. 3A illustrates an example growth process of a self-writing waveguide, arranged in accordance with at least some embodiments described herein.

As shown in a diagram 300A, a tubular structure 302 may be formed from a mixture, composed of a first and a second photo-reactive liquid monomer dissolved in a carrier solvent and nanoparticles. An optical fiber 308 may provide a focused light beam to the tubular structure 302 to cure the first monomer, initiating polymerization. Initially, the outgoing curing source may expand from the optical fiber tip 310 into a cone 312. As illustrated in tubular structure 304, once the first monomer is substantially cured, the focused light beam may be terminated and a core 316 of a self-writing waveguide may be formed. During polymerization the second monomer 314 may remain as a liquid and freely diffuse out of the pathway of the focused light beam. As illustrated in tubular structure 306, the tubular structure may be further exposed to an optical source, heat source, or electron beam source to cure the second monomer within the tubular structure. Exposure to the curing sources may initiate polymerization of the second monomer, forming a cladding 318 of the self-writing waveguide that may surround the core 320 of the self-writing waveguide.

The focused light beam may be provided to the tubular structure in visible, infrared, or ultra-violet light spectra or may be provided as a laser beam with a wavelength of 390 nm to 980 nm. Upon the provision of the focused light beam to the tubular structure, the first monomer, having a higher refractive index than the second monomer, may diffuse into the focused light beam path and become polymerized within the path. Polymerization may occur upon activation of a photo-initiator that was infused into the first monomer prior to mixture with the second monomer. During the initial polymerization process, the second monomer may diffuse freely, remaining in liquid form. Over time, the focused light beam path may become rich with the first monomer, creating a high refractive index region in the light beam path that may form the core 316 of the self-writing waveguide. The size and functionality of the core of the self-writing waveguide formed may depend on the refractive index difference of the polymerized and un-polymerized regions of the tubular structure. Optionally, the tubular structure may then be exposed to the optical, heat, or electron beam sources to cure the second monomer, initiating polymerization to form a cladding of the self-writing guide that surrounds the core of the waveguide. Polymerization may occur upon activation of a photo-initiator infused into the second monomer prior to mixture with the first monomer. Exposure may also serve to bleach the photo-initiator of the first monomer to reduce absorption loses within the core of the waveguide.

FIG. 3B illustrates a laser and ultra-violet (UV) curable material use in fabrication of an example self-writing waveguide, arranged in accordance with at least some embodiments described herein.

As shown in a diagram 300B, an optical fiber 334 may provide a focused laser light 332 to a circuit board 340 in, which a planar film structure 342 is formed in situ to laminate a backplane of the circuit board containing a plurality of components 344. The planar film structure 342 may be formed from a mixture, composed of a first and a second photo-reactive monomer dissolved in a carrier solvent and nanoparticles. The focused laser light 332 may be terminated upon substantial polymerization of the first monomer in the planar film structure 342, forming a core of a self-writing waveguide. The planar film structure 342 may then be exposed to a ultra-violet (UV) light source 336 to cure the second monomer in the planar film structure, initiating polymerization to form a cladding of the self-writing waveguide.

The planar film structure 342 may be free-standing and self-supporting, which may allow formation of the planar film structure in situ to laminate a backplane of a circuit board. The planar film structure may be free-standing and self-supporting due to a gel formed upon the addition of the nanoparticles to the mixture of the first and second photo-reactive liquid monomers dissolved in the carrier, solvents. The interconnect among the nanoparticles may create internal scaffolding and the first and second photo-reactive monomers may be held to the nanoparticles by capillary forces, which prevent them from flowing as a traditional liquid, forming a two-phase medium.

Figure 4:
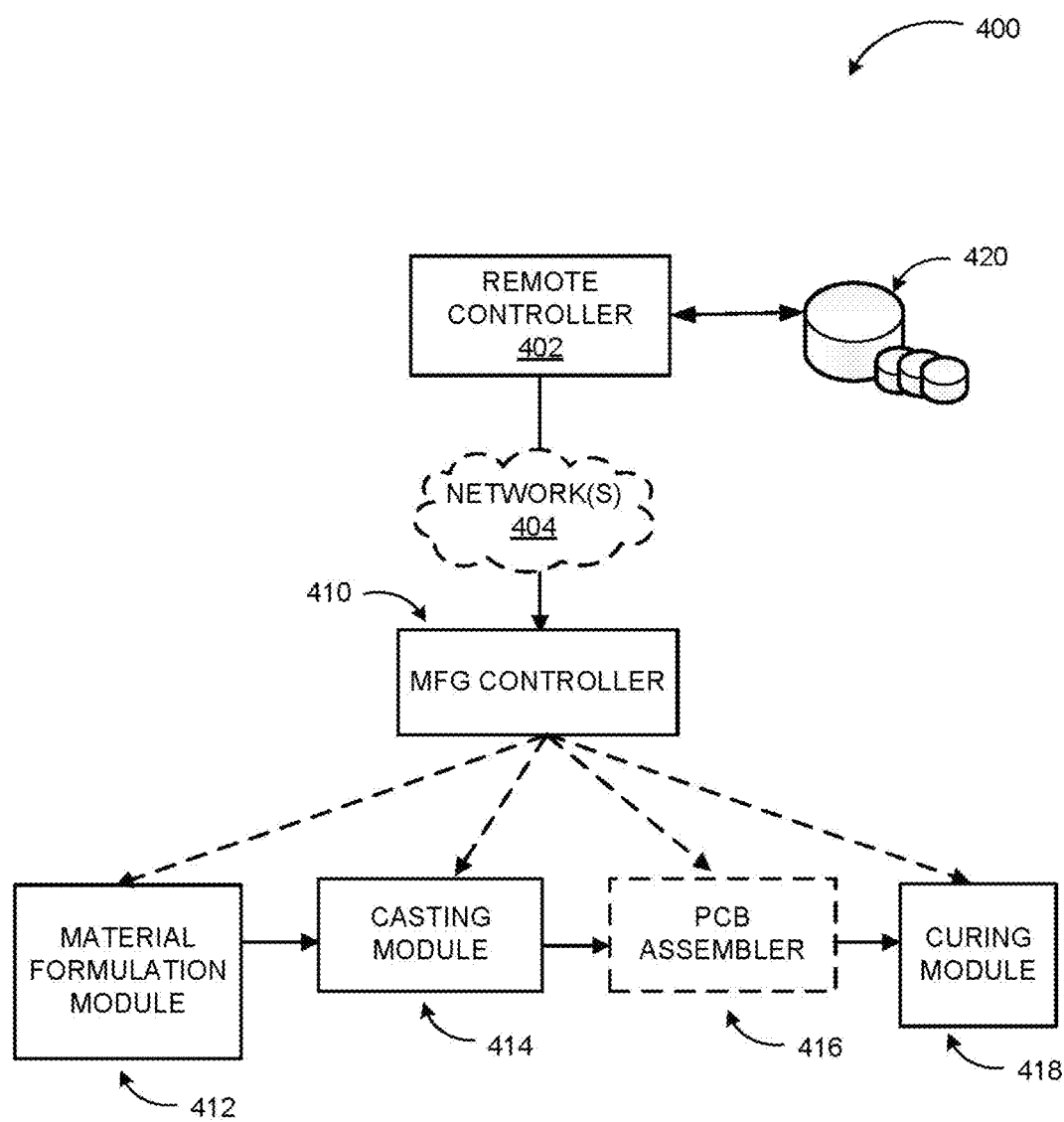
FIG. 4 illustrates an example system for fabricating a self-writing waveguide.

FIG. 4 illustrates an example system for fabricating a self-writing waveguide, arranged in accordance with at least some embodiments described herein.

A system 400 may include a manufacturing controller 410, a material formulation module 412, a casting module 414, an optional PCB assembler 416, and a curing module 418. The manufacturing controller 410 may be operated by human control, or may be directed by a remote controller 402 via network 404. Data associated with controlling the different processes of fabricating a self-writing waveguide may be stored at and/or received from data stores 420.

The material formulation module 412 may prepare a mixture by mixing a first and a second photo-reactive liquid monomer, each infused with a photo-initiator prior to mixing, and dissolving them in a carrier solvent. The material formulation module 412 may further add nanoparticles to the mixture to form a gel. The casting module 414 may form a substantially tubular structure or a planar film structure from the gel that may free-standing and self-supporting. The optional PCB assembler 416 may form the planar film structure for lamination onto a circuit board using a roll to roll process. The PCB assembler 416 may alternatively form the planar film structure in situ to laminate a backplane of a circuit board.

To form the self-writing waveguide, the curing module 418 may cure the tubular or planar structure or the backplane of the circuit board on which the planar film structure was formed. The curing module 418 may provide a focused light beam to cure the first monomer, initiating polymerization through activation of the photo-initiator infused into the first monomer. Polymerization of the first monomer may form a core of a self-writing waveguide and upon substantial polymerization the focused light beam may be terminated by the curing module 418. The curing module 418 may then optionally expose the tubular or planar film structure to an optical, source, a heat source, or an electron beam source to cure the second monomer. Exposure to the curing source may initiate polymerization upon activation of the photo-initiator infused into the second monomer. Optional exposure may further bleach the photo-initiator of the first monomer which may reduce absorption loss within the waveguide.

The examples in FIGS. 1 through 4 have been described using specific processes and applications in which fabricating a self-writing waveguide may be implemented. Embodiments fabricating a self-writing waveguide are not limited to the processes and applications according to these examples.

Figure 5:
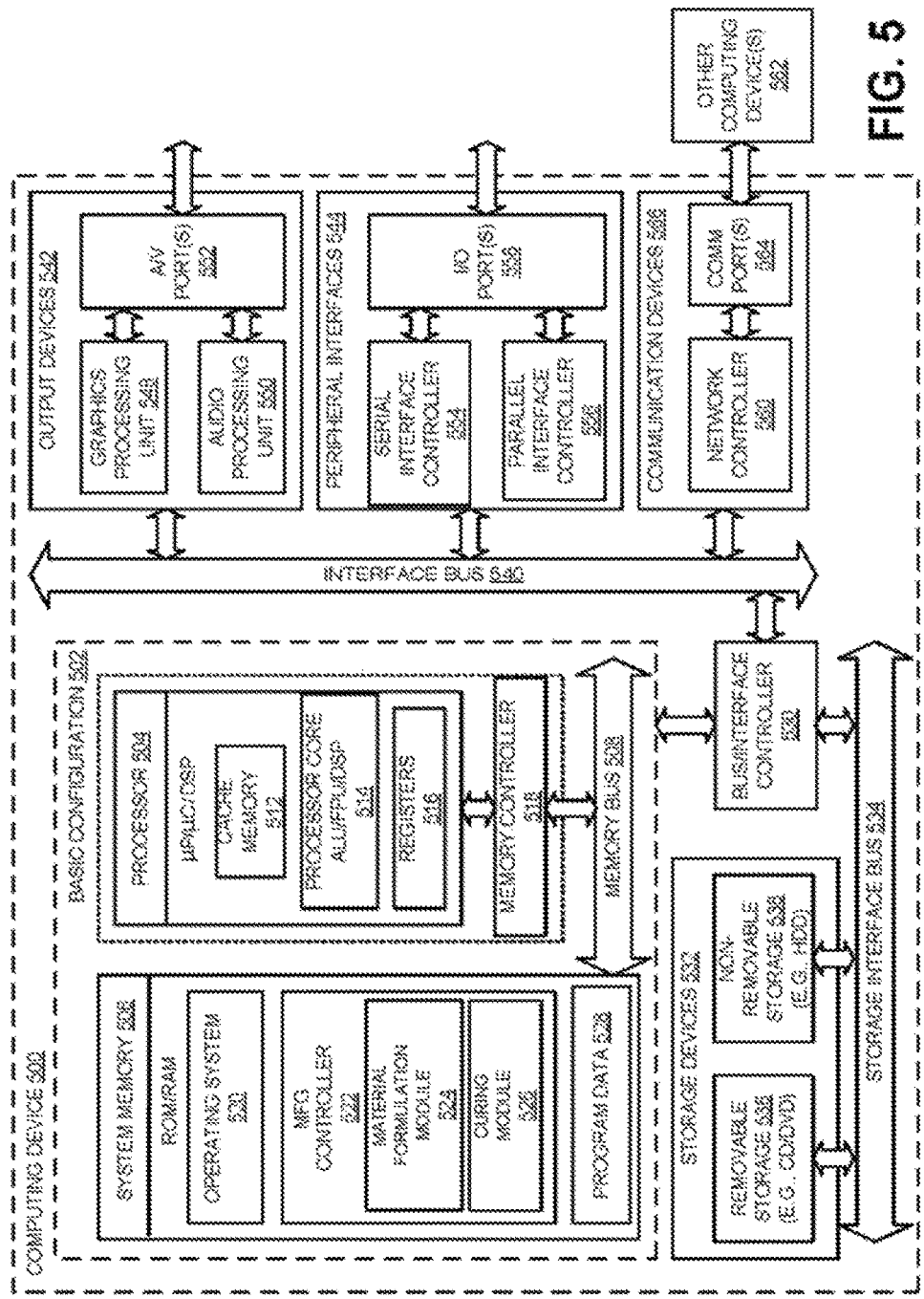
FIG. 5 illustrates a general purpose computing device, which may be used to control a process of fabricating a self-writing waveguide.

FIG. 5 illustrates a general purpose computing device, which may be used to control a process of fabricating a self-writing waveguide, arranged in accordance with at least some embodiments described herein.

For example, the computing device 500 may be used to fabricate a self-writing waveguide as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one or more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a manufacturing controller 522, and program data 528. The manufacturing controller 522 may include a material formulation module 524 to prepare a mixture by mixing a first and a second photo-reactive liquid monomer, dissolving in a carrier solvent, and adding nanoparticles, and a curing module 526 to provide a focused light beam to polymerize the first monomer and optionally provide a secondary source to cure the second monomer, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives (SSD), or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be, configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for fabricating a circuit board with a self-writing film to create an optical interface. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
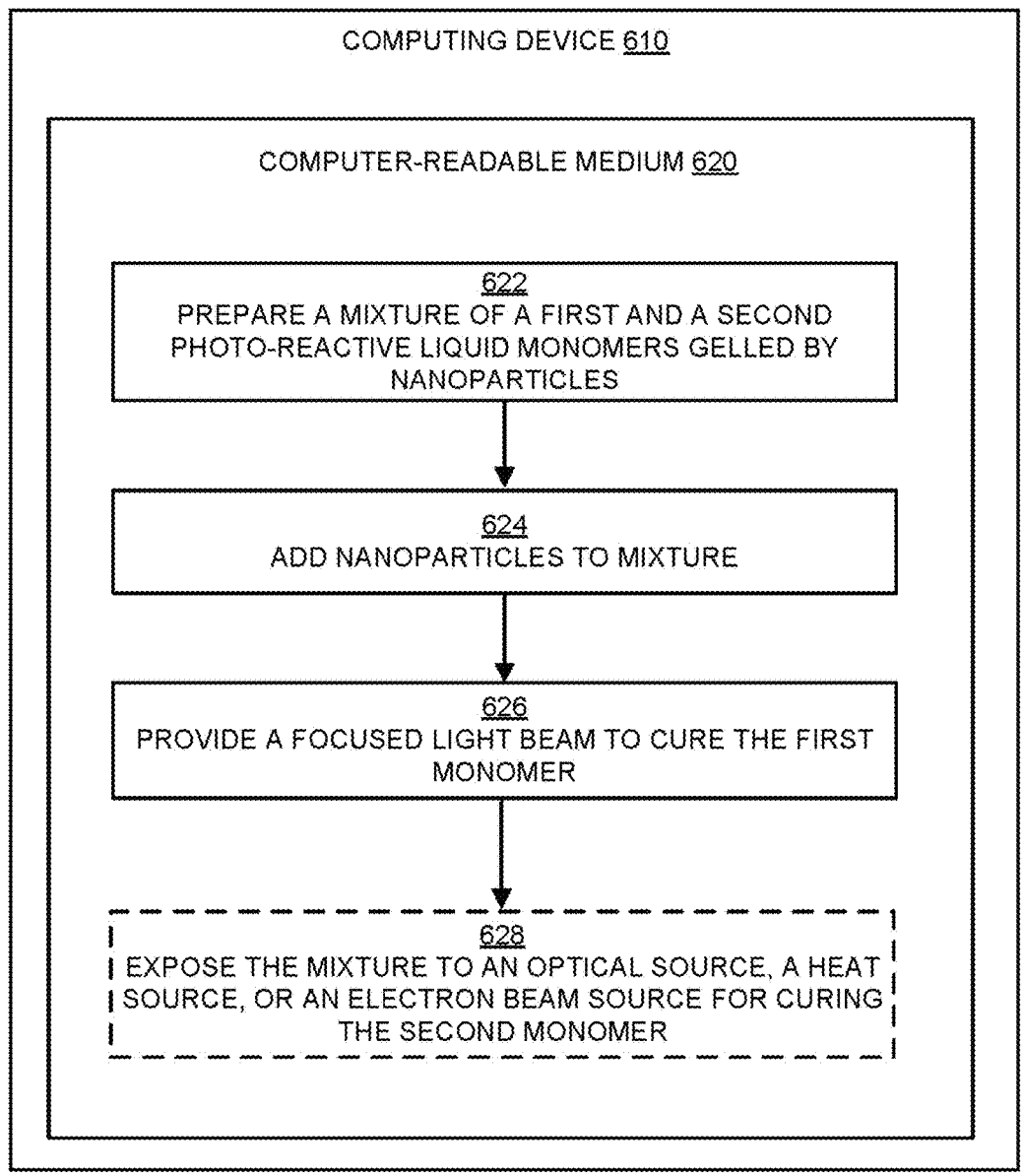
FIG. 6 is a flow diagram illustrating an example method for fabricating a self-writing waveguide that may be performed by a computing device such as the computing device in FIG. 5.

FIG. 6 is a flow diagram illustrating an example method for fabricating a self-writing waveguide that may be performed by a computing device such as the computing device in FIG. 5, arranged in accordance with at least some embodiments described herein.

Example methods may include one or more operations, functions or actions as illustrated by one or more of blocks 622, 624, 626, and/or 628 and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for fabricating a self-writing waveguide may begin with block 622, "MIXING A FIRST PHOTO-REACTIVE LIQUID MONOMER AND A SECOND PHOTO-REACTIVE LIQUID MONOMERS TO FORM A MIXTURE", where a first photo-reactive liquid monomer 204 and a second photo-reactive liquid monomer 206, each infused with a photo-initiator prior to mixing, may be mixed and dissolved in a carrier solvent to form a mixture.

Block 622 may be followed by block 624, "ADDING NANOPARTICLES TO THE MIXTURE", where nanoparticles 104 may be added to the mixture by shear-mixing or sonication. The nanoparticles may be fumed silica, acidic silica, alumina, titania, or ceria and may be added in varying fractions to the mixture as illustrated in FIGS. 1A and 1B.

Block 624 may be followed by block 626, "PROVIDE A FOCUSED LIGHT BEAM TO CURE THE FIRST MONOMER", where a focused light beam 252 may be provided to the mixture in visible, infrared, or ultra-violet light spectra or provided as a laser beam, where the wavelength may be from 390 nm to 980 nm. Provision of the focused light beam may activate the photo-initiator of the first photo-reactive liquid monomer to initiate, polymerization. Once the first photo-reactive liquid monomer is substantially cured, forming a core portion of a self: writing waveguide, the focused light beam may be terminated.

Block 626 may be followed by block 628, "EXPOSE THE MIXTURE TO AN OPTICAL SOURCE, A HEAT SOURCE, OR AN ELECTRON BEAM SOURCE FOR CURING THE SECOND MONOMER", where the mixture may be optionally exposed to an optical source, a heat source, or an electron beam source to cure the second photo-reactive liquid monomer 206. The optional exposure may activate a photo-initiator of the second monomer to initiate polymerization forming a cladding portion of a self-writing waveguide.

Figure 7:
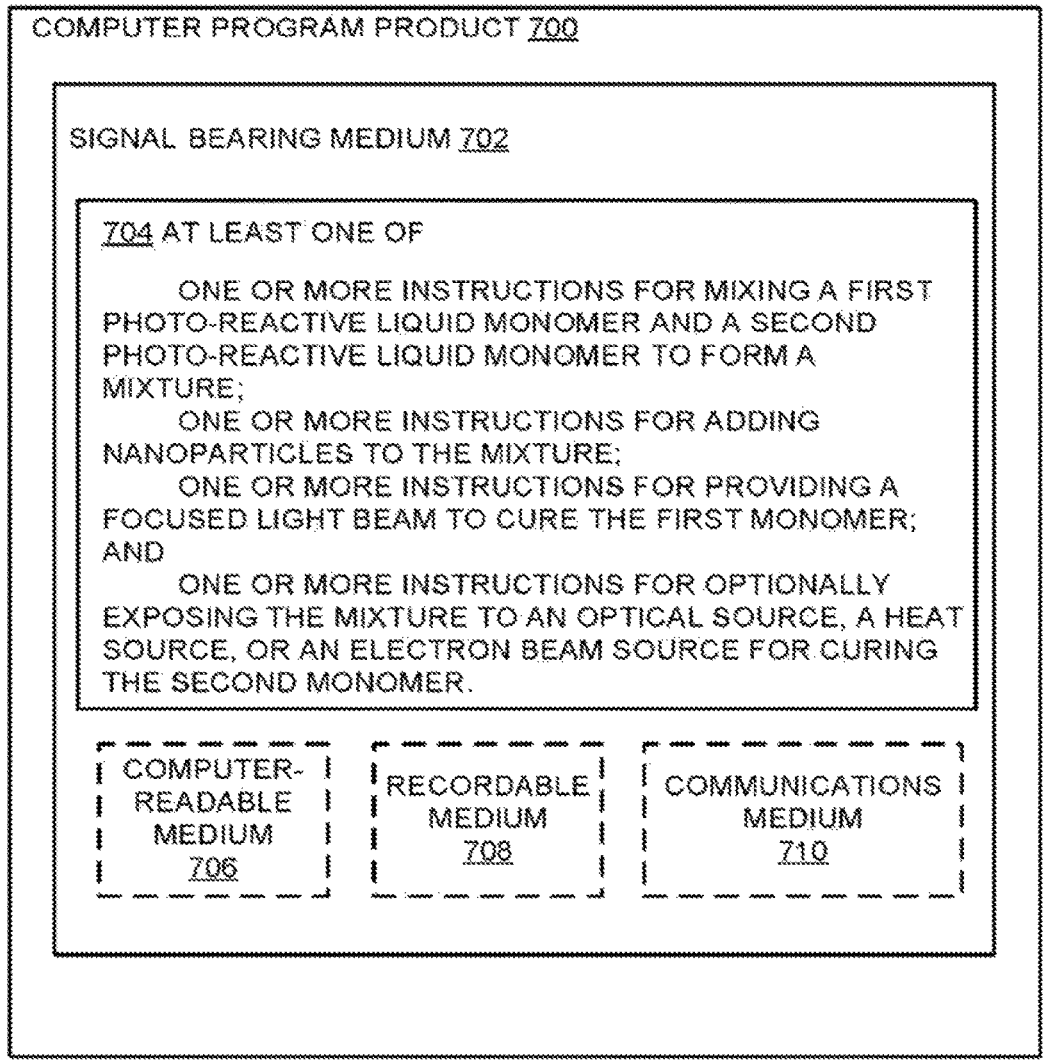
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by for example, a processor may provide the functionality described herein. Thus, for example, referring to the processor 504 in FIG. 5, the manufacturing controller 522, the material formulation module 524, or the curing module 526 may undertake one or more of the tasks shown in FIG. 7 in response to the instructions 704 conveyed, to the processor 504 by the signal bearing the medium 702 to perform actions associated with fabricating a self-writing film to create an optical interface as described herein. Some of those instructions may include, for example, mixing a first photo-reactive liquid monomer and a second photo-reactive liquid monomer to form a mixture, adding nanoparticles to the mixture, providing a focused light beam to cure the first monomer, and optionally exposing the mixture to an optical source, a heat source, or an electron beam source for curing the second monomer, according to some embodiments described herein.

In some implementations, the signal bearing medium 702 depicted in FIG. 7 may encompass a computer-readable medium 706, such as, but not limited to, a hard disk drive (HDD), a solid state drive (SDD), a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (for example, a fiber optic cable, a waveguide, a wired communication link, a wireless communication link, etc.). Thus, for example, the computer program product 700 may be conveyed to one or more modules of the processor 704 by an RF signal bearing medium, where the signal bearing medium 702 is conveyed by the wireless communications medium 710 (for example, a wireless communications medium conforming with the IEEE 802.11 standard).

According to some examples, a method is provided for fabricating a self-writing waveguide. The method may include mixing a first photo-reactive liquid monomer and a second photo-reactive liquid monomer to form a mixture, and adding nanoparticles to the mixture. The method may also include providing a focused light beam to cure the first monomer.

According to other examples, the focused light beam may be terminated when the first monomer is substantially cured and the mixture may be exposed to at least one of an optical source, a heat source, and an electron beam source for curing the second monomer upon curing the first monomer. A photo-initiator may be infused into the first monomer before forming the mixture and the photo-initiator may be bleached by exposing the mixture to one of the optical source, the heat source, and the electron beam source. The second monomer may remain in a liquid form while the first monomer is cured.

According to further examples, mixing the first monomer and the second monomer may form a gel from at least one of the first monomer and the second monomer in liquid form and one or more nanoparticles, where the gel allows a free diffusion of the liquid form monomers. The first monomer, the second monomer, and the nanoparticles may be selected based on one or more of a curing speed of the mixture, a mechanical modulus of the mixture, and a refractive index difference between the first and second monomers upon curing. The first monomer is a cationic monomer and the first monomer may be infused with a cationic photo-initiator. The first monomer, the second monomer, and the nanoparticles may be further selected such that the self-writing was has an operational temperature range of about −55° C. to about 125° C. The focused light beam may be provided in the visible, infrared, or ultraviolet light spectra and may be provided as a laser beam, where the laser beam has a wavelength of about 390 nm to about 980 nm.

According to yet further examples, the self-writing waveguide may be formed in a substantially tubular structure or a planar film structure, where the cured first monomer forms a core and the cured second monomer forms a cladding of the self-writing waveguide. The planar film self-writing waveguide may be formed in situ as a laminate on a circuit board backplane or formed for lamination using a roll-to-roll process, where the planar film self-writing waveguide is free-standing and self-supporting. A stiffness of the self-writing waveguide may be selected by adjusting a nanoparticle fraction in the mixture.

According to some examples, mixture of the first monomer and the second monomer comprises may include dissolving the monomers in a carrier solvent prior to adding the nanoparticles. Preparation of the mixture of the first monomer and the second monomer may include infusing the first monomer and the second monomer with respective photo-initiators. The nanoparticles may be fumed silica, acidic silica, alumina, titania, or ceria, the first monomer may be a cationic monomer or an ionic monomer, and the second monomer may be a radical monomer. The nanoparticles may be added to the mixture by shear-mixing or sonication. Preparation of the mixture may include mixing a cationic monomer infused with a cationic photo-initiator at a first wavelength and a radical polymerizable monomer infused with a near infrared radiation (NIR) free radical initiator, dissolving the mixture in a carrier solvent, and adding silica-based nanoparticles.

According to some embodiments, a self-writing waveguide composed of nanoparticle-gelled polymers is described. The self-writing waveguide may include a core portion composed of a first polymer and a cladding portion composed of a second polymer. A first photo-reactive liquid monomer and a second photo-reactive liquid monomer gelled by nanoparticles may be mixed, a focused light beam provided to cure the first monomer, and the mixture exposed to at least one of an optical source, a heat source, and an electron beam source for curing the second monomer upon polymerization of the first monomer.

According to other embodiments, the photo-initiator may be infused into the first monomer before forming the mixture and the photo-initiator may be bleached by exposing the mixture to one of the optical source, the heat source, and the electron beam source. The second monomer may remain in a liquid form while the first monomer is cured. The first monomer, the second monomer, and the nanoparticles may be selected based on one or more of: a curing speed of the mixture, a mechanical modulus of the mixture, and a refractive index difference between the first and second monomers upon curing. The first monomer may be a cationic monomer and may be infused with a cationic photo-initiator. The first monomer, the second monomer, and the nanoparticles may be selected such that the self-writing waveguide, has an operational temperature range of about −55° C. to about 125° C. The focused light beam may be provided in the visible, infrared, or ultraviolet light spectra and may be provided as a laser beam, where the laser beam has a wavelength of about 390 nm to about 980 nm.

According to further embodiments, the self-writing waveguide may be formed in a substantially tubular structure or a planar film structure, where the planar, film self-writing waveguide may be formed in situ as a laminate on a circuit board backplane. The planar film self-writing waveguide may be free-standing and self-supporting. The nanoparticles may be fumed silica, acidic silica, alumina, titania, or ceria, the first monomer may be a polymerizable cationic monomer or a polymerizable ionic monomer, and the second monomer may be a polymerizable radical monomer.

According to some examples, a system is described for forming a self-writing waveguide. The system may include a material formulation module configured to prepare a mixture of a first photo-reactive liquid monomer and a second photo-reactive liquid monomer combined with nanoparticles. The system may also include a curing module configured to provide a focused light beam to cure the first monomer and a controller configured to coordinate one or more operations of the material formulation module and the curing module.

According to other examples, the curing, module may be further configured to terminate the focused light beam when the first monomer is substantially cured and to expose the mixture to an optical source, a heat source, or an electron beam source for curing the second monomer upon polymerization of the first monomer. The curing module may be further configured to infuse a photo-initiator into the first monomer before forming the mixture and bleach the photo-initiator by exposing the mixture to one of the optical source, the heat source, and the electron beam source. The second monomer may remain in a liquid form while the first monomer is cured. The material formulation module may be further configured to form a gel from at least one of the first monomer and the second monomer in liquid form and one or more nanoparticles, and the gel allows a free diffusion of the liquid form monomers. The controller may be further configured to select the first monomer, the second monomer, and the nanoparticles based on one or more of: a curing speed of the mixture, a mechanical modulus of the mixture, and a refractive index difference between the first monomer and second monomer upon curing. The first monomer may be, a cationic monomer and may be infused with a cationic photo-initiator. The controller may be further configured to select the first monomer, the second monomer, and the nanoparticles such that the self-writing waveguide has an operational temperature range of about −55° C. to about 125° C.

According to further examples, the curing module may be further configured to provide the focused light beam in the visible, infrared, or ultraviolet light spectra and to provide the focused light beam as a laser beam, wherein the laser beam has a wavelength of about 390 nm to about 980 nm. A casting module may be configured to form the self-writing, waveguide in a substantially tubular structure or a planar film structure, where the cured first monomer forms a core and the cured second monomer forms a cladding of the self-writing waveguide. The casting module may be further configured to form the planar film self-writing waveguide in situ as a laminate on a circuit board backplane, wherein the planar film self-writing waveguide is free-standing and self-supporting. The curing module may be further configured to adjust a nanoparticle fraction, in the mixture to reach a desired stiffness of the self-writing waveguide. The material formulation module may be configured to prepare the mixture of the first monomer and the second monomer by dissolving the monomers in a carrier solvent prior to adding the nanoparticles.

According to yet further examples, the material formulation module may be further configured to infuse the first monomer and the second monomer with respective photo-initiators. The nanoparticles may be fumed silica, acidic silica, alumina, titania, or ceria, the first monomer may be a polymerizable cationic monomer or a polymerizable ionic monomer, and the second monomer may be a polymerizable radical monomer. The material formulation module may be configured to add the nanoparticles to the mixture by shear-mixing or sonication. The material formulation module may be further configured to mix a cationic monomer infused with a cationic photo-initiator at a first wavelength and a radical monomer infused with a near infrared radiation (NIR) free radical initiator, dissolve the mixture in a carrier solvent, and add silica-based nanoparticles. The controller may be coupled communicatively to a remote controller through at least one network.

EXAMPLES

Following are illustrative examples of how some embodiments may be implemented, and are not intended to limit the scope of embodiments in any way.

Example 1

A Mixture Composed of a First Cationic Liquid Monomer, a Second Free Radical Liquid Monomer, and Fumed Silica Nanoparticles A first cationic liquid monomer, [2,3,3,3-Tetrafluoro-2-(trifluoromethoxy)propyl]oxirane, may be infused with a cationic photo-initiator, 4,4[prime]-Bis[di(â-hydroxy) phenylsulfonic]phenylsulfide-bis-hexafluoroantimonate. A second free radical liquid monomer, methyl methacrylate, may be infused with a near infrared radiation (NIR) free radical photo-initiator, H-Nu-IR 815, and combined with the first monomer. The two monomers may be dissolved in isopropyl alcohol (IPA) in a ratio of 3:1 by weight relative to the monomers' to form a liquid mixture. 15 percent by weight fumed silica nanoparticles (based on the monomers' weight) may then be added to the mixture by shear-mixing.

Provision of a focused infrared light beam with a wavelength of 850 nm may substantially cure the first cationic monomer. Curing the first monomer may initiate polymerization upon activation of the infused cationic photo-initiator to form a core of, a self-writing waveguide. The second radical monomer may remain as a liquid and diffuse freely during polymerization. Upon termination of the focused infrared light, the mixture may be further exposed to a heat source to cure the second monomer, initiating polymerization upon activation of the infused free radical initiator to form a cladding of the self-writing waveguide. The heat source exposure may also bleach the infused photo-initiator of the first monomer to reduce the absorption at telecommunication wavelengths, improving waveguide performance.

Example 2

A Mixture Composed of a First Ionic Liquid Monomer, a Second Free Radical Liquid Monomer, and Fumed Silica Nanoparticles A first ionic liquid epoxy monomer (with a fluorinated anion to lower the monomer's refractive index) may be combined with a second free radical liquid monomer, 1-ethyl-3-methylimidazolium acrylate. Ionic liquids, which have no appreciable vapor pressure, may reduce volatility of the monomers and improve thermal stability of the films cast from the monomers. The two monomers may be dissolved in isopropyl alcohol (IPA) in a ratio of 3:1 by weight relative to the monomers to form a liquid mixture. 15 percent by weight fumed silica (based on the monomers' weight) nanoparticles may then be added to the liquid mixture. The fumed silica may be added into the mixture using shear-mixing.

A focused visible light beam with a wavelength of 500 nm may be provided to the liquid mixture to substantially cure the first ionic liquid epoxy monomer. Curing the first monomer may initiate polymerization of the first monomer, upon activation of the monomer infused photo-initiator, to form a core of a self-writing waveguide. The fluorinated anion may polymerize by a radical method and the cation may be polymerized by a cationic method causing the respective counterions to remain with the daughter, polymer. Meanwhile, the second radical monomer, 1-ethyl-3-methylimidazolium acrylate may remain as a liquid and freely diffuse during polymerization. Upon termination of the focused visible light beam, further exposure to a laser beam may cure the second monomer. Curing the second monomer may initiate polymerization of the second monomer, upon activation of the monomer infused photo-initiator, to form a cladding of the self-writing waveguide in a planar film structure. The planar film self-writing waveguide may be formed in situ as a laminate on a circuit board backplane.

Example 3

A Mixture Composed of a First Cationic Liquid Monomer, a Second Free Radical Liquid Monomer, and Acidic Silica Nanoparticles A first cationic liquid monomer, [2,3,3,3-Tetrafluoro-2-(trifluoromethoxy)propyl]oxirane, may be infused with a cationic photo-initiator, 4,4[prime]-Bis[di(â-hydroxy)phenylsulfonic]phenylsulfide-bis-hexafluoroantimonate. A second free radical liquid monomer, 1-ethyl-3-methylimidazolium acrylate, may be infused with an NIR free radical initiator, H-Nu-IR 815, and combined with the first monomer. The two monomers may be dissolved in isopropyl alcohol (IPA) in a ratio of 3:1 by weight relative to the monomers' to form a liquid mixture. Acidic silica nanoparticles may be added to the liquid mixture to achieve a higher nanoparticle loading improving the mechanical properties of the self-writing material. A dispersion of 30 percent by weight, acidic silica nanoparticles in IPA may be directly added.

Provision of a focused ultra-violet (UV) light beam with a wavelength of 390 nm may substantially cure the first cationic monomer, initiating polymerization to form a core of a self-writing waveguide. Polymerization may be initiated upon activating the infused cationic photo-initiator. The second radical monomer may remain as a liquid and diffuse freely during polymerization. Upon termination of the focused UV light beam, further exposure to an electron beam source may cure the second monomer, initiating polymerization of the second monomer to form a cladding of the self-writing waveguide in a planar film structure. Polymerization may be initiated upon activating the infused cationic photo-initiator. The planar film self-writing waveguide may then be used for lamination onto a circuit board using a roll to roll process.

There is little distinction left between hardware and software implementations of aspects of systems; the use of hardware or software is generally (but not, always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has, set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and, thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal, processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors for moving and/or adjusting components and/or quantities).

A typical system may be implemented utilizing any suitable commercially available components, such as those typically found in systems for fabricating a self-writing waveguide. The herein described subject matter sometimes illustrates different components contained within, or connected with different other components. It is to be understood that, such, depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that, the desired functionality is achieved, irrespective of architectures or, intermediate components. Likewise, any two components so associated may also be viewed as being "operably connected", or "operably coupled", to each other to achieve the desired functionality, and any two components capable of being so associated may also be viewed as being "operably coupleable", to each other to achieve the desired functionality. Specific examples of operably coupleable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will, be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and, all purposes, such as in terms of providing a written description, all ranges disclosed herein also encompass any and, all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein, can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled, in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for fabricating a self-writing waveguide, the method comprising:
mixing a first photo-reactive liquid monomer and a second photo-reactive liquid monomer to form a mixture, wherein the first photo-reactive liquid monomer is infused with a photo-initiator;
adding nanoparticles to the mixture to form a gel, wherein the nanoparticles comprise one or more of: fumed silica and acidic silica, and
a type and a number of the nanoparticles added is based on a curing speed of the mixture and a mechanical modulus of the mixture;
selecting a stiffness of the self-writing waveguide by adjusting a fraction of the nanoparticles in the mixture;
providing a focused light beam to cure the first photo-reactive liquid monomer;
exposing the mixture to at least one of an optical source, a heat source, and an electron beam source for curing the second photo-reactive liquid monomer upon curing the first photo-reactive liquid monomer; and
bleaching the photo-initiator by exposing the mixture to one of the optical source, the heat source, and the electron beam source.

2. The method of claim 1, further comprising terminating the focused light beam when the first photo-reactive liquid monomer is substantially cured.

3. The method of claim 1, wherein the gel allows a free diffusion of the liquid form of the first photo-reactive and second photo-reactive monomers.

4. The method of claim 1, further comprising selecting the first photo-reactive liquid monomer, the second photo-reactive liquid monomer, and the nanoparticles further based on a refractive index difference between the first and second photo-reactive liquid monomers upon curing.

5. The method of claim 1, wherein the first photo-reactive liquid monomer is a cationic monomer.

6. The method of claim 1, wherein the first photo-reactive liquid monomer is infused with a cationic photo-initiator.

7. The method of claim 1, further comprising selecting the first photo-reactive liquid monomer, the second photo-reactive liquid monomer, and the nanoparticles such that the self-writing waveguide has an operational temperature range of about −55° C. to about 125° C.

8. The method of claim 1, further comprising providing the focused tight beam as a laser beam.

9. The method of claim 8, wherein the laser beam has a wavelength of about 390 nm to about 980 nm.

10. The method of claim 1, further comprising terming the self-writing waveguide in a substantially tubular structure or a planar film structure, wherein the cured first photo-reactive liquid monomer forms a core and the cured second photo-reactive liquid monomer forms a cladding of the self-writing waveguide.

11. The method of claim 10, further comprising forming the self-writing waveguide in the planar film structure in situ, as a laminate on a circuit board backplane.

12. The method of claim 10, further comprising forming the self-writing waveguide in the planar film for lamination using a roll-to-roll process.

13. The method of claim 10, wherein the self-writing waveguide in the planar film is free-standing and self-supporting.

14. The method of claim 1, wherein mixing the first photo-reactive liquid monomer and the second photo-reactive liquid monomer comprises dissolving the first photo-reactive and second photo-reactive liquid monomers in a carrier solvent prior to adding the nanoparticles.

15. The method of claim 1, wherein the first photo-reactive liquid monomer comprises a polymerizable cationic monomer or a polymerizable ionic monomer.

16. The method of claim 1, wherein the second photo-reactive liquid monomer comprises a polymerizable radical monomer.

17. The method of claim 1, further comprising adding the nanoparticles to the mixture by shear-mixing or sonication.

18. The method of claim 1, wherein mixing comprises mixing a cationic monomer infused with a cationic photo-initiator at a first wavelength and a radical monomer infused with a near infrared radiation (NIR) free radical initiator to form the mixture, dissolving the mixture in a carrier solvent, and adding silica-based nanoparticles.

19. A method for fabricating a self-writing waveguide, the method comprising:
mixing a first photo-reactive liquid monomer and a second photo-reactive liquid monomer to form a mixture;
adding nanoparticles to the mixture to form a gel, wherein the nanoparticles comprise one or more of: fumed silica and acidic silica, and
a type and a number of the nanoparticles added is based on a curing speed of the mixture and a mechanical modulus of the mixture;
selecting a stiffness of the self-writing waveguide by adjusting a fraction of the nanoparticles in the mixture;
providing a focused light beam to cure the first photo-reactive liquid monomer; and
terminating the focused light beam when the first photo-reactive liquid monomer is substantially cured.

20. The method of claim 19, wherein the second photo-reactive liquid monomer remains in a liquid form while the first photo-reactive liquid monomer is cured.

21. The method of claim 19, wherein preparing the mixture of the first photo-reactive liquid monomer and the second photo-reactive liquid monomer comprises infusing the first photo-reactive liquid monomer and the second photo-reactive liquid monomer with respective photo-initiators.

\* \* \* \* \*

UNITED STATES PATENT AND TRADEMARK OFFICE
CERTIFICATE OF CORRECTION

PATENT NO. : 9,765,178 B2
APPLICATION NO. : 14/899123
DATED : September 19, 2017
INVENTOR(S) : Duerksen et al.

It is certified that error appears in the above-identified patent and that said Letters Patent is hereby corrected as shown below:

In Column 1, Line 4, delete "CROSS REFERENCE" and insert -- CROSS-REFERENCE --, therefor.

In Column 1, Line 8, delete "USC." and insert -- U.S.C. --, therefor.

In Column 1, Lines 19-20, delete "medium, to" and insert -- medium to --, therefor.

In Column 2, Line 55, delete "hereof In" and insert -- hereof. In --, therefor.

In Column 4, Line 2, delete "Acidic, silica," and insert -- Acidic silica --, therefor.

In Column 4, Line 3, delete "to, improve" and insert -- to improve --, therefor.

In Column 4, Line 11, delete "nanoparticles' to" and insert -- nanoparticles to --, therefor.

In Column 4, Line 22, delete "between, the" and insert -- between the --, therefor.

In Column 4, Line 59, delete "material, prior" and insert -- material prior --, therefor.

In Column 5, Line 12, delete "be, perturbed" and insert -- be perturbed --, therefor.

In Column 6, Line 2, delete "with, a" and insert -- with a --, therefor.

In Column 6, Lines 60-61, delete "in, which" and insert -- in which --, therefor.

In Column 7, Line 13, delete "carrier, solvents." and insert -- carrier solvents. --, therefor.

In Column 7, Line 54, delete "optical, source," and insert -- optical source, --, therefor.

In Column 9, Line 8, delete "be, configured" and insert -- be configured --, therefor.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,765,178 B2

In Column 10, Line 28, delete "initiate, polymerization." and insert -- initiate polymerization --, therefor.

In Column 10, Line 30, delete "self: writing" and insert -- self-writing --, therefor.

In Column 10, Line 48, delete "by for" and insert -- by, for --, therefor.

In Column 10, Line 54, delete "conveyed, to" and insert -- conveyed to --, therefor.

In Column 10, Line 55, delete "bearing the medium" and insert -- bearing medium --, therefor.

In Column 11, Line 1, delete "(SDD)," and insert -- (SSD), --, therefor.

In Column 11, Line 42, delete "of a" and insert -- of: a --, therefor.

In Column 11, Line 48, delete "was" and insert -- waveguide --, therefor.

In Column 12, Line 39, delete "waveguide, has" and insert -- waveguide has --, therefor.

In Column 12, Line 47, delete "planar, film" and insert -- planar film --, therefor.

In Column 12, Line 65, delete "curing, module" and insert -- curing module --, therefor.

In Column 13, Line 19, delete "be, a" and insert -- be a --, therefor.

In Column 13, Lines 30-31, delete "self-writing, waveguide" and insert -- self-writing waveguide --, therefor.

In Column 13, Line 39, delete "fraction, in" and insert -- fraction in --, therefor.

In Column 14, Line 23, delete "of, a" and insert -- of a --, therefor.

In Column 14, Line 62, delete "daughter, polymer." and insert -- daughter polymer. --, therefor.

In Column 15, Line 26, delete "weight, acidic" and insert -- weight acidic --, therefor.

In Column 15, Line 45, delete "not, always," and insert -- not always, --, therefor.

In Column 15, Line 61, delete "has, set" and insert -- has set --, therefor.

In Column 16, Line 53, delete "and, thereafter" and insert -- and thereafter --, therefor.

In Column 16, Line 63, delete "signal, processors," and insert -- signal processors, --, therefor.

In Column 17, Line 8, delete "with different" and insert -- with, different --, therefor.

CERTIFICATE OF CORRECTION (continued)
U.S. Pat. No. 9,765,178 B2

In Column 17, Line 9, delete "that, such," and insert -- that such --, therefor.

In Column 17, Line 18, delete "that, the" and insert -- that the --, therefor.

In Column 17, Line 19, delete "or, intermediate" and insert -- or intermediate --, therefor.

In Column 18, Lines 8-9, delete "will, be" and insert -- will be --, therefor.

In Column 18, Line 18, delete "and, all" and insert -- and all --, therefor.

In Column 18, Line 20, delete "and, all" and insert -- and all --, therefor.

In Column 18, Line 31, delete "skilled, in" and insert -- skilled in --, therefor.

In Column 19, Line 22, in Claim 8, delete "tight" and insert -- light --, therefor.

In Column 19, Line 25, in Claim 10, delete "terming" and insert -- forming --, therefor.